Feb. 10, 1925.

F. G. WESTERHOLD 1,525,481

ADJUSTABLE DRAFT DEVICE

Filed Oct. 4, 1923

Inventor
F. G. Westerhold

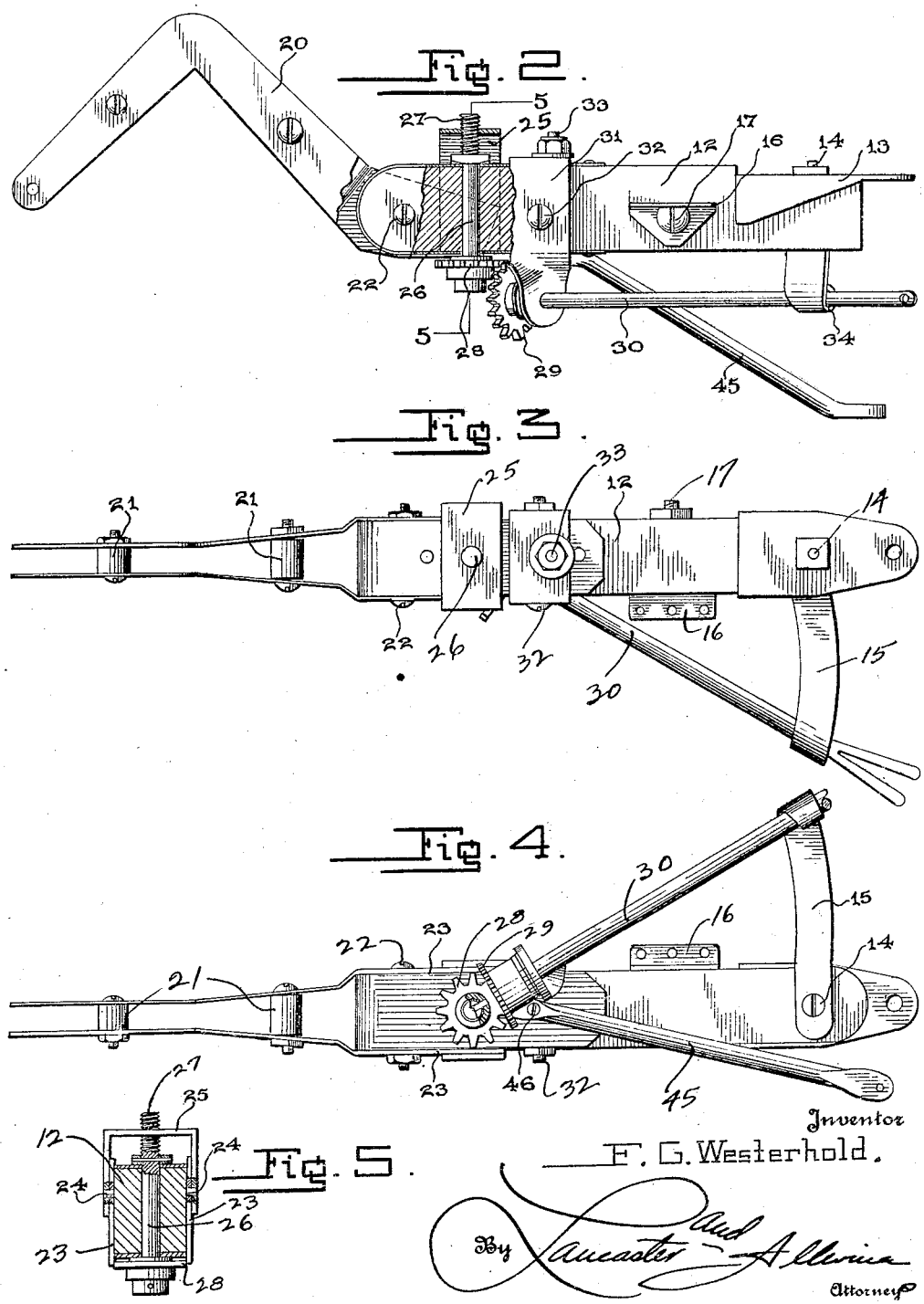

Patented Feb. 10, 1925.

1,525,481

UNITED STATES PATENT OFFICE.

FREDRICK G. WESTERHOLD, OF PENDER, NEBRASKA.

ADJUSTABLE DRAFT DEVICE.

Application filed October 4, 1923. Serial No. 666,523.

*To all whom it may concern:*

Be it known that I, FREDRICK G. WESTERHOLD, a citizen of the United States, residing at Pender, in the county of Thurston and State of Nebraska, have invented certain new and useful Improvements in an Adjustable Draft Device, of which the following is a specification.

The present invention relates to draft gear, and more particularly to that type used between tractors and agricultural machines.

An object of the invention is to provide a draft bar which is mounted upon a binder, or other machine, and which may be adjusted to extend from the machine at the desired angle to dispose the line of draft through the machine as desired and as compared to the center of the draft device or animals.

The invention further aims to provide a draft bar which may be adjusted manually from the seat of the machine, and which is so arranged that the adjustment may be made merely by the turning of the handle in opposite directions and no wrenches, tools or the like need be used for making the adjustment.

A still further object of the invention is to provide a draft bar adjustment of this character which embodies interlocking features between the parts so that when adjustment is made the parts are maintained against displacement and cannot by pressure or by vibration be moved out of adjustment.

A further object is to provide an adjustable draw bar which comprises but few parts easily attached to the trailing machine and which may take the place of the usual draw bars having no adjustable feature.

The above, and various other objects and advantages of this invention will in part be described in, and in part be understood from, the following detailed description of the present preferred embodiment of this invention, the same being illustrated in the accompanying drawings, wherein:

Fig. 2 is a top plan view, enlarged, and partly in section, of the draw bar in detail.

Fig. 3 is an edge of the same looking toward the edge uppermost in Fig. 2.

Fig. 4 is an opposite edge view of the same.

Fig. 5 is a transverse section taken through the device substantially on the line 5—5 of Fig. 2.

Figure 1:
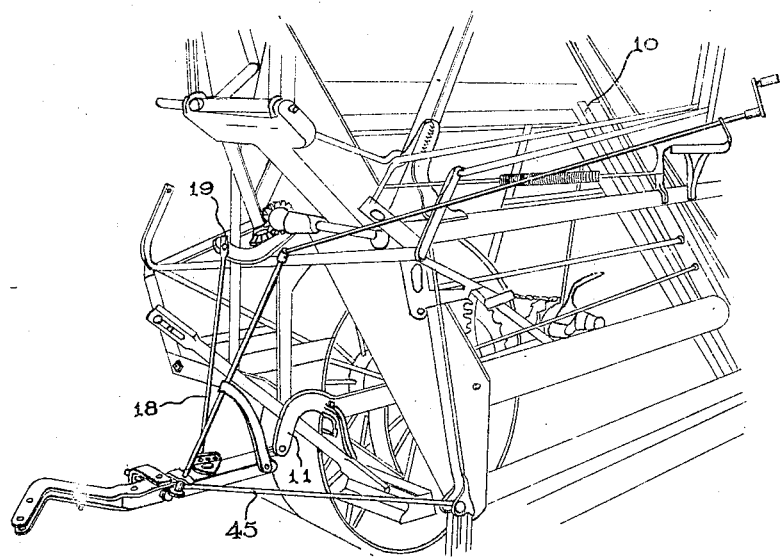
Fig. 1 is a perspective view of a draw bar or hitch applied to a binder, the latter being shown in light lines.
Figure 6:
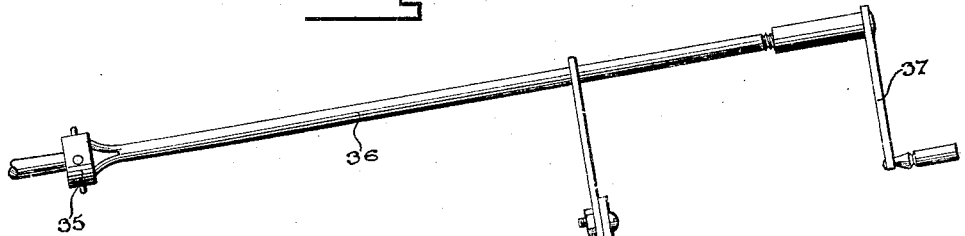
Fig. 6 is a detail enlarged view of the operating handle and rod employed.

Referring to the drawings, 10 designates a binder to which a device constructed according to this invention is applied. The front end of the binder has the usual arm or clevis 11 to which the draft device is adapted to be coupled. The draft device comprises a body 12 which may be of wood or other suitable material and which is substantially rectangular in cross section and of desired length and provided upon its rear end with an attaching ear 13 of pressed metal for pivotal connection with the clevis 11. The ear 13 is clamped against one side of the body 12 by a bolt 14 which extends through the body 12 and which has a head adapted to engage against the outer side of a bracket arm 15 which extends upwardly from the body 12 to a suitable height. The ear 13 projects in a straight line direction from the inner end of the body 12 and is held from turning upon the bolt 14 by wings which are turned over against the upper and lower faces of the body 12. The body 12 is provided with an angle iron 16, the base flange of which is secured against the body 12 by a bolt 17 which preferably passes entirely through the body and clamps the opposite sides thereof. The other flange of the angle iron 16 projects upwardly and has a series of perforations adapted to selectively receive the lower end of a suspension rod 18 attached at its lower end by bolt 19 to an upper portion of the binder 10. The suspension rod 18 is adjusted to support the body 12 at the desired horizontal position.

The forward end of the body 10 carries a pivoted section 20 which is made up of a pair of spaced bars which are held in spaced apart relation by spacers 21 and which at their inner ends engage over the upper and lower sides of the body 12 and are pivoted thereto by a bolt 22. This forward extension of the body may thus be swung about the pivot 22 and dispose the outer end of the section at the desired angle relatively to the line of draft. As will be seen from Figs. 1 and 2, the outer end of the hinged section is apertured to receive a coupling pin or the like for connecting the draft device to a tractor. The inner ends of the hinged section extend beyond the pivot 22 and provide arms 23 which are pivotally connected at 24 to the ends of a yoke 25 which is slidably engaged over one edge of the body 12 in rear of the pivot 22. A shaft 26 is mounted to turn in the body 12 in rear of and at right angles to the pivot 22. The shaft 26 has a threaded portion 27 which engages through the closed end of the yoke 25 and which is adapted to slide the yoke back and forth over the body when the shaft is turned. The shaft 26 carries a gear wheel 28 upon one end with which meshes a second gear wheel 29 mounted on a shaft 30 which extends upwardly and rearwardly from the shaft 26. The shaft 30 is mounted in a bearing bracket 31 which is bolted at 32 and 33 to the body 12 to support the shaft 30 and hold it at right angles to the shaft 26. The shaft 30 extends upwardly and rearwardly and through a bearing 34 and is connected by a universal coupling 35 to a rod 36 which extends lengthwise of the binder 10 to a suitable point, and at such point is provided with a crank handle 37. The rod 36 extends along the binder to a suitable point where the handle may be conveniently turned in either direction by the operator while the binder is being drawn.

Figure 7:
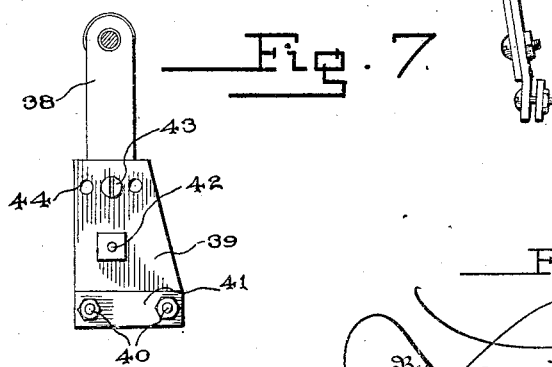
Fig. 7 is a detail side elevation of the bracket for the operating rod and handle.

The rear end of the rod 36 is mounted in a bracket arm 38 which forms a bearing for the rod and which is attached to a plate 39 detachably mounted on a convenient portion of the binder. The plate 39 has a pair of bolts 40 in its lower edge and a strap 41 is mounted on the bolt so that the strap and plate may be arranged against opposite sides of an edge portion of the binder. The bracket arm 38 is mounted at its lower end upon a bolt 42 which is carried through an intermediate portion of the plate 39. The intermediate part of the bracket arm 38 is provided with a bolt 43 which is selectively engaged in one of a series of openings 44 formed in the upper edge of the plate. The bracket arm 38 may be adjusted to extend in an upright direction as shown in Fig. 7, or may be adjusted to project at an angle from the upper end of the plate 39. The openings 44 are of sufficient diameter to receive the bolt 43, particularly since there is a natural free play of the parts and a relatively slight swinging movement of the bracket arm 38.

The body portion 12 of the draft device is further braced upon the binder by a laterally extending brace rod 45 which is secured by screws 46 or the like to the side of the body 12 near the bracket 31, the outer end of the brace rod 45 being secured to the front end of the binder. The body 12 is therefore rigidly secured upon the forward end of the machine and the front section 20 may be swung at different angles upon the body 12. The adjustment may be made by the operator by turning the handle 37 in either direction so as to cause the binder to follow the tractor in the desired position depending on conditions met with during the use of the machine.

It is of course understood that various modifications and changes may be made in the details of construction and design of the above specifically described embodiment without departing from the spirit of the invention, such changes and modifications being restricted only by the scope of the following claims.

What is claimed is:

1. In a draft gear for trailers, a body section, means for rigidly mounting the body section on the trailer, a bell crank structure pivotally connected with the outer end portion of said body and having swinging movement in a horizontal plane, a yoke engaging about the body section and pivotally connected to the inner end portion of said bell crank structure for swinging the bell crank structure upon movement of the yoke, and a threaded member rotatably carried by the body section, said threaded member engaging the yoke and when rotated adapted to move the same for swinging said bell crank structure.

2. In draft gear for trailers, a body section, means for rigidly mounting the body section on the trailer, a vertical pivot mounted in the outer end of the body section, a pair of bars mounted on said pivot and having swinging arms upon their inner ends, a yoke engaging about the body section and pivotally connected to said arms for swinging the bars upon the movement of the yoke, and a threaded member carried by the body section, said member engaging the yoke and adapted to move the same for swinging said bars.

3. In draft gear for trailers, a body section, means for rigidly mounting the body section upon the forward end of the trailer, a hinged section mounted on the forward end of the body section, and arranged to swing in a horizontal plane, a yoke slidably fitting over one edge of the body section and pivotally connected to said hinged member, and a shaft mounted in the body section at right angles to the pivotal axis of the hinged section and having a threaded portion engaging the yoke for sliding the same and moving the hinged section.

4. In draft gear for trailers, a body section, means for rigidly mounting the body section on the forward end of the trailer, a bell crank structure pivotally mounted on the body section and having swinging movement in a horizontal plane, a shifting member movable transversely of the body section and pivotally connected to the inner end portion of said bell crank structure for swinging the bell crank structure upon movement of the shifting member, a shaft mounted on the body section and having threaded engagement with said shifting member, a jointed operating rod connected to the shaft, and a handle mounted upon the remote end of the jointed rod for turning the same and the shaft to swing the hinged section into the desired angle on the body section.

5. In draft gear for trailers, a body section, means for rigidly mounting the body section on the front end of a trailer, a hinged section mounted on the body section and adapted for direct connection to a source of draft, a shifting member mounted on the body section and connected to the hinged section, a shaft connected to the shifting member, a jointed rod connected to the shaft for turning it, a bracket arm engaging said rod for supporting the remote end thereof, a bracket plate adjustably connected to the bracket and having clamping means for engaging a portion of the trailer, and a handle mounted on the remote end of the jointed rod.

FREDRICK G. WESTERHOLD.